United States Patent [19]

DePorter et al.

[11] Patent Number: 5,438,103

[45] Date of Patent: Aug. 1, 1995

[54] BLOCK COPOLYMERS OF MONOVINYLAROMATIC AND CONJUGATED DIENE MONOMERS

[75] Inventors: Craig D. DePorter; Ralph C. Farrar, Jr.; Nathan E. Stacy; George A. Moczygemba, all of Bartlesville, Okla.

[73] Assignee: Phillips Petroleum Company, Bartlesville, Okla.

[21] Appl. No.: 216,725

[22] Filed: Mar. 23, 1994

[51] Int. Cl.6 ............................................. C08F 297/04
[52] U.S. Cl. ................................... 525/314; 525/250; 525/271
[58] Field of Search ........................... 525/250, 271, 314

[56] References Cited

U.S. PATENT DOCUMENTS

| | | | |
|---|---|---|---|
| 3,670,054 | 6/1972 | De La Mare et al. | 525/314 |
| 3,725,368 | 4/1973 | Morrison et al. | 526/180 |
| 3,937,760 | 2/1976 | Cole et al. | 525/271 |
| 4,004,070 | 1/1977 | Farrar | 526/86 |
| 4,133,845 | 1/1979 | Beck et al. | 525/354 |
| 4,285,751 | 8/1981 | Feinberg et al. | 156/242 |
| 4,297,451 | 10/1981 | Uraneck et al. | 525/366 |
| 4,584,346 | 4/1986 | Kitchen | 525/98 |
| 4,925,899 | 5/1990 | Rendina | 525/314 |
| 5,130,377 | 7/1992 | Trepka | 525/314 |
| 5,256,736 | 10/1993 | Trepka et al. | 525/314 |
| 5,290,875 | 3/1994 | Moezygemba | 525/314 |
| 5,319,033 | 6/1994 | Trepka | 525/314 |

*Primary Examiner*—James J. Seidleck
*Assistant Examiner*—I. Zemel
*Attorney, Agent, or Firm*—Phillips Petroleum Company

[57] ABSTRACT

A method for preparing block copolymers from which can be made transparent blue articles comprising sequentially charging under polymerization conditions at least one monovinylaromatic monomer and at least one conjugated diene monomer, wherein at least the first monomer charge is a monovinylaromatic monomer charge polymerized in the presence of an initiator; wherein at least one other charge polymerized in the presence of an initiator is a monomer selected from the group of conjugated diene monomers and mixtures of monovinylaromatic and conjugated diene monomers; wherein the final monomer charge is a conjugated diene charge; and thereafter charging the reaction mixture with at least one coupling agent. The invention copolymers are particularly useful for applications such as packaging, display devices, toys and decorative items in which transparent blue appearance is desired without significant compromise of other physical and mechanical properties.

11 Claims, No Drawings

BLOCK COPOLYMERS OF MONOVINYLAROMATIC AND CONJUGATED DIENE MONOMERS

FIELD OF THE INVENTION

This invention relates to block copolymers of monovinylaromatic and conjugated diene monomers and methods of preparation of these block copolymers.

BACKGROUND OF THE INVENTION

These have developed needs for polymers which can be made into transparent blue articles without additional colorants, i.e., polymers that can be made into articles which have high blueness values. There have been developed copolymers of monovinylaromatic and conjugated diene monomers which can be made into colorless transparent articles that have low blueness due at least in part to modification of the light scattering properties of the molecular structure of the polymer. But the need for copolymers by monovinylaromatic and conjugated diene monomers which can be made into attractive, clear articles with high blueness values, good impact strength and other advantageous properties is yet unfilled. The polymers satisfying these needs should be suitable for use with conventional extrusion, injection and blow molding equipment and also suitable for use in other methods of forming plastics into containers, tubes, films, fibers, and the like.

Much effort has been directed to the preparation of substantially transparent polymodal monovinylaromatic-conjugated diene block copolymer resins with a variety of block structures produced by a variety of monomer addition and initiator sequences and a variety of coupling agents. Blueness of articles formed from various monovinylaromatic-conjugated diene copolymers and blends of these copolymers with other polymers is a longstanding problem in applications where colorless materials are desirable because of the unpredictability of how much blueness will result from the multifarious polymodal structures and blends thereof. Conversely, the same unpredictability is encountered when it is desired to obtain high blueness values in the polymers to avoid subsequent use of colorants that may or may not give as attractive an appearance without loss of transparency.

SUMMARY OF THE INVENTION

It is an object of this invention to provide novel resinous block copolymers of vinyl-substituted aromatic hydrocarbons and conjugated dienes from which can be made articles with high blueness and good mechanical properties.

A further object of this invention is to provide a novel process for making resinous block copolymers of vinyl-substituted aromatic hydrocarbons and conjugated dienes from which can be made articles with high blueness and good mechanical properties.

We have discovered that resinous monovinylaromatic-conjugated diene copolymers which are transparent and blue colored and which can be made into articles with good mechanical properties can be produced by sequential polymerization that includes at least one charge of conjugated diene monomer polymerized in the presence of initiator so as to produce polymeric species with conjugated diene terminal blocks.

The polymers of this invention are prepared by a method comprising sequentially charging under polymerization conditions at least one monovinylaromatic monomer and at least one conjugated diene monomer; wherein at least the first monomer charge is a monovinylaromatic monomer charge polymerized in the presence of an initiator; wherein at least one other charge polymerized in the presence of an initiator charge is a conjugated diene monomer or a mixture of conjugated diene and monovinylaromatic monomers; wherein the final monomer charge is a conjugated diene charge; and thereafter charging the reaction mixture with at least one coupling agent.

In a first embodiment of the invention (described in terms of polymerization steps), copolymers are prepared by sequentially contacting under polymerization conditions and in the presence of a randomizer:

(a) an initiator and a monovinylaromatic monomer; thereafter (b) an initiator and a monovinylaromatic monomer; thereafter (c) a conjugated diene; thereafter (d) an initiator and a mixture of monovinylaromatic monomer and conjugated diene monomer; thereafter (e) a conjugated diene; and (f) a coupling agent.

Alternatively, the monomers in step (d) can be charged sequentially rather than as a mixture, with the conjugated diene and initiator being charged and essentially complete polymerization allowed prior to a separate charge of the monovinylaromatic monomer which is allowed to polymerize essentially completely before the (e) step.

In a second alternative to this first embodiment of the invention, the charge of a mixture of monomers in step (d) is replaced by a charge of an initiator and monovinylaromatic monomer which is made prior to complete polymerization of the monomer charge made in step (c).

In a second embodiment (again described in terms of polymerization steps) the inventive copolymers are prepared by sequentially contacting under polymerization conditions and in the presence of a randomizer:

(a) an initiator and a monovinylaromatic monomer; thereafter (b) an initiator and a mixture of monovinylaromatic monomer and conjugated diene monomer; thereafter (c) a conjugated diene monomer; thereafter (d) an initiator and a monovinylaromatic monomer; thereafter (f) a coupling agent.

Alternatively, the monomers in step (b) can be charged sequentially rather than as a mixture, with the conjugated diene and initiator being charged prior to a separated charge of the monovinylaromatic monomer.

DETAILED DESCRIPTION OF THE INVENTION

We have discovered novel monovinylaromatic/conjugated diene block copolymers which can be formed into articles with high blueness and advantageous mechanical properties.

The polymers of this invention are characterized as resinous non-rubbery block copolymers of at least one conjugated diene with at least one monovinylarene, having at least six polymeric species and are prepared so that, when the choice of coupling agent permits, at least a portion of the final product is of a branched, coupled character.

The polymers prepared according to this invention contain from about 55 to about 95, preferably from about 60 to about 90, more preferably from about 65 to about 85, weight percent of copolymerized monovinyl substituted aromatic hydrocarbon monomer based on the weight of total monomers employed. Correspondingly, the inventive copolymers contain from about 45 to about 5, preferably from about 40 to about 10, and more preferably from about 35 to about 15 weight percent copolymerized conjugated diene monomer based on the total weight of monomers incorporated into the copolymer.

The coupled portions of the resinous polymodal block copolymers of this invention have polymonovinylaromatic blocks on the ends of some of the extending arms of at least some of the linear or radial copolymer molecules and conjugated diene blocks on the ends of some of the extending arms of at least some of the linear or radial copolymer molecules. At least one tapered block of monovinylaromatic hydrocarbon and conjugated diene is present in each of the polymeric species of the embodiments of this invention in which the two monomers are contemporaneously present in the reaction zone. The first embodiment of this invention will have no tapered blocks if the monomers in step (d) are charged sequentially and all monomer charges are allowed to polymerize until essentially no free monomer is present before any subsequent monomer charge is made.

The polymers of the second embodiment of this invention will have, at least in the higher molecular weight species, an internal tapered block when the two monomers are contemporaneously present in the reaction zone in step (b) of the polymerization. At least a portion of the intermediate molecular weight species of the second embodiment of this invention will have a tapered block on the ends of some of the extending arms of at least some of the linear or radial copolymer molecules if the monomers in step (d) are charged contemporaneously. The second embodiment will have no tapered blocks if, as in the alternative method, the monomers of step (b) are charged sequentially and all monomer charges are allowed to polymerize until essentially no free monomer is present before any subsequent monomer charge is made.

The resinous copolymeric polymodal products of both embodiments of this invention and the three alternatives thereto, also contain portions of linear uncoupled block copolymers of poly(monovinylarene)/poly(conjugated diene); the linear uncoupled block copolymer content will have some conjugated diene terminated polymer chains and some monovinylaromatic terminated polymer chains and is considered to be an important portion of the resinous product with respect to its overall properties.

Components

The process of this invention can be carried out using as an initiator any of the organomonoalkali metal compounds of the formula RM wherein R is an alkyl, cycloalkyl or arylcarbanion containing 4 to 8 carbon atoms and M is an alkali metal cation. Mixtures of organoalkali metal compounds can be used. The presently preferred initiators are alkylmonolithium compounds, especially n-butyllithium or sec-butyllithium.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Each of the charges containing conjugated diene in the same sequence of charges may be the same, but is not necessarily the same, conjugated diene monomer or mixture of conjugated diene monomers. The presently preferred conjugated diene monomer is 1,3-butadiene.

The monovinylaromatic monomers which can be used contain 8 to 12 carbon atoms and include styrene, alpha-methylstyrene, 4-methylstyrene, 3-methylstyrene, 2-methylstyrene, 4-ethylstyrene, 3-ethylstyrene, 2-ethylstyrene, 4-tert-butylstyrene, 2,4-dimethylstyrene and condensed aromatics such as vinyl napthalene and mixtures thereof. Each of the charges containing monovinylaromatic monomer in the same sequence of charges may be the same, but is not necessarily the same, monovinylaromatic monomer or mixture of monovinylaromatic monomers. The presently preferred monovinylaromatic monomer is styrene.

Examples of polar compounds which can be advantageously employed as randomizers and/or promoters of initiators are ethers, thioethers (sulfides), metal alkoxides and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetramethylene oxide (tetrahydrofuran), dimethyl sulfide, diethyl sulfide, di-n-propyl sulfide, di-n-butyl sulfide, methyl ethyl sulfide, potassium tert-butoxide, potassium tert-amyloxide, dimethylethylamine, tri-n-propylamine, tri-n-butylamine, trimethylamine, triethylamine, tetramethylethylenediamine, tetraethylethylenediamine, pentamethyldiethylenetriamine, N,N-di-methylaniline, N-methyl-N-ethylaniline, N-methylmorpholine, and the like. It is to be understood also that mixtures of these polar compounds can be employed in the practice of the present invention. Presently preferred are tetrahydrofuran, diethyl ether or potassium-tert-amylate.

Among the suitable coupling agents are the di- or multivinylaromatic compounds, di- or multiepoxides, di- or multiisocyanates, di- or multiimines, di- or multialdehydes, di- or multiketones, alkoxytin compounds, di- or multihalides, particularly silicon halides and halosilanes, mono-, di-, or multianhydrides, mono-, di-, or multiesters, preferably the esters of monoalcohols with polycarboxylic acids, diesters which are esters of monohydric alcohols with dicarboxylic acids, lactones, monobasic acids with polyalcohols such as glycerol, and the like, including compounds containing two or more of these groups and mixtures of two or more compounds.

Useful multifunctional coupling agents include epoxidized vegetable oils such as epoxidized soybean oil, epoxidized linseed oil and the like or mixtures thereof.

The presently preferred coupling agent is an epoxidized vegetable oil. Presently preferred is epoxidized soybean oil.

Process

The unique polymodal block character of the polymers and high blueness and good impact strength of articles made from the polymers of this invention are produced by the unique sequences of charges of initiator, monovinylaromatic monomer, conjugated diene, and coupling agent used to make the novel polymers.

In each of the two embodiments of this invention, the first charge of initiator and monomer produces an active living monovinyl aromatic component polymer block with an alkali metal atom (from the initiator) associated with the active end of the polymer block and an alkyl group capping the inactive end. The alkyl group is very small relative to the polymer block and has no real influence on the physical properties of the resin. For this reason, its presence is usually ignored and the monovinyl aromatic polymer block is referred to as the inactive end of the polymer chain. However, the alkyl group can influence some chemical properties of the polymer such as inhibiting the depolymerization to monomer of that end of the block at high temperatures. Each subsequent monomer charge adds monomer to the living polymer chain at the alkali metal reaction site.

With each subsequent charge which includes initiator a new polymer-alkali metal species will be produced, and each subsequent monomer charge has an opportunity for polymerization of part of the charge with each of the existing polymer-alkali metal species. The active living polymer chains from the first initiator will have monovinyl aromatic polymer blocks on both ends after polymerization of each charge containing monovinyl aromatic monomer. When mixtures of monovinyl aromatic monomer and conjugated diene are charged, the polymer chains have as an end block the polymonovinyl aromatic rich ends of the tapered blocks associated with the alkali metal. When conjugated diene monomer is charged with the second or third initiator charge, the polymer chain from the first initiator will have a monovinylaromatic aromatic polymer block on one end and conjugated diene polymer block at the active end of the polymer species. Species created by either the second or third initiator charge accompanied by a diene monomer will be comprised of polymer chains with conjugated diene blocks on both active and inactive ends of the species.

After virtually complete polymerization of the final monomer charge, the active living linear block copolymers are charged with a difunctional or polyfunctional coupling agent to allow coupling of each of the living species with each of the other living species or with others of the same living species to form the desired polymodal tapered block copolymers. If the coupling agent is not 100 percent efficient and/or if less or more than a stoichiometric amount of coupling agent is used, there can be some uncoupled terminated polymer chains of each of the species in the final reaction mixture. Use of difunctional coupling agents will produce predominantly linear polymer chains. Depending upon amount used and functionality, various degrees and kinds of branching may be accomplished with polyfunctional coupling agents.

The charging sequences of this invention and the resulting polymers at each stage are exemplified using a selected monovinylaromatic monomer, conjugated diene and polyfunctional coupling agent in the following Tables 1, 2, 3, 4 and 5.

TABLE 1

| Invention Charging Sequence (First Embodiment) | | |
|---|---|---|
| Steps | Component | Resulting Polymer Chains |
| (a) | randomizer, initiator$_1$ and styrene$_1$ | $S_1$-Li$_1$ |
| (b) | initiator$_2$ and styrene$_2$ | $S_1$-$S_2$-Li$_1$ |

TABLE 1-continued

| Invention Charging Sequence (First Embodiment) | | |
|---|---|---|
| Steps | Component | Resulting Polymer Chains |
|  |  | $S_2$-Li$_2$ |
| (c) | butadiene$_1$ | $S_1$-$S_2$-$B_1$-Li$_1$ |
|  |  | $S_2$-$B_1$-Li$_2$ |
| (d) | initiator$_3$, butadiene$_2$ and styrene$_3$ | $S_1$-$S_2$-$B_1$-$B_2$/$S_3$-Li$_1$ |
|  |  | $S_2$-$B_1$-$B_2$/$S_3$-Li$_2$ |
|  |  | $B_2$/$S_3$-Li$_3$ |
| (e) | butadiene$_3$ | $S_1$-$S_2$-$B_1$-$B_2$/$S_3$-$B_3$-Li$_1$ |
|  |  | $S_2$-$B_1$-$B_2$/$S_3$-$B_3$-Li$_2$ |
|  |  | $B_2$/$S_3$-$B_3$-Li$_3$ |
| (f) | coupling agent | polymodal tapered block copolymers with styrene terminal blocks and butadiene terminal blocks | where S = styrene block
B = butadiene block
B/S = tapered block
Li = residue from a monoalkali metal initiator remaining on the end of the polymerization chain or reaction site prior to termination or coupling.
subscripts = designation of the numerical order in which that particular component was charged or formed.

TABLE 2

| Invention Charging Sequence (First Alternative to First Embodiment) | | |
|---|---|---|
| Steps | Components | Resulting Polymer Chains |
| (a) | randomizer, initiator$_1$ and styrene$_1$ | $S_1$-Li$_1$ |
| (b) | initiator$_2$ and styrene$_2$ | $S_1$-$S_2$-Li$_1$ |
|  |  | $S_2$-Li$_2$ |
| (c) | butadiene$_1$ | $S_1$-$S_2$-$B_1$-Li$_1$ |
|  |  | $S_2$-$B_1$-Li$_2$ |
| (d) | initiator$_3$ and butadiene$_2$ | $S_1$-$S_2$-$B_1$-$B_2$-Li$_1$ |
|  |  | $S_2$-$B_1$-$B_2$-Li$_2$ |
|  |  | $B_2$-Li$_3$ |
| (e) | styrene$_3$ | $S_1$-$S_2$-$B_1$-$B_2$-$S_3$-Li$_1$ |
|  |  | $S_2$-$B_1$-$B_2$-$S_3$-Li$_2$ |
|  |  | $B_2$-$S_3$-Li$_3$ |
| (f) | butadiene$_3$ | $S_1$-$S_2$-$B_1$-$B_2$-$S_3$-$B_3$-Li$_1$ |
|  |  | $S_2$-$B_1$-$B_2$-$S_3$-$B_3$-Li$_2$ |
|  |  | $B_2$-$S_3$-$B_3$-Li$_3$ |
| (g) | coupling agent | polymodal block copolymers with both styrene and butadiene terminal blocks | where S = styrene block
B = butadiene block
Li = residue from a monoalkali metal initiator remaining on the end of the polymerization chain or reaction site prior to termination or coupling.
subscripts = designation of the numerical order in which that particular component was charged or formed.

TABLE 3

| Invention Charging Sequence (Second Alternative to First Embodiment) | | |
|---|---|---|
| Steps | Components | Resulting Polymer Chains |
| (a) | randomizer, initiator$_1$ and styrene$_1$ | $S_1$-Li$_1$ |
| (b) | initiator$_2$ and styrene$_2$ | $S_1$-$S_2$-Li$_1$ |
|  |  | $S_2$-Li$_2$ |
| (c) | butadiene$_1$ | $S_1$-$S_2$-$B_1$-Li$_1$ |
|  |  | $S_2$-$B_1$-Li$_2$ |
| (d) | initiator$_3$ and styrene$_3$, before (c) complete | $S_1$-$S_2$-$B_1$-($B_1$)/$S_3$-Li |
|  |  | $S_2$-$B_1$-($B_1$)/$S_3$-Li |
|  |  | ($B_1$)/$S_3$-Li |
| (e) | butadiene$_2$ | $S_1$-$S_2$-$B_1$-($B_1$)/$S_3$-$B_2$-Li |
|  |  | $S_2$-$B_1$-($B_1$)/$S_3$-$B_2$-Li |
|  |  | ($B_1$)/$S_3$-$B_2$-Li |
| (g) | coupling agent | polymodal block copolymers with both styrene and |

TABLE 3-continued

Invention Charging Sequence
(Second Alternative to First Embodiment)

| Steps | Components | Resulting Polymer Chains |
|---|---|---|
| | | butadiene terminal blocks | where S = styrene block
B = butadiene block
(B)/S = tapered block formed with unreacted conjugated diene from previous monomer charge
Li = residue from a monoalkali metal initiator remaining on the end of the polymerization chain or reaction site prior to termination or coupling.
subscripts = designation of the numerical order in which that particular component was charged or formed.

TABLE 4

Invention Charging Sequence (Second Embodiment)

| Steps | Components | Resulting Polymer Chains |
|---|---|---|
| (a) | randomizer, initiator$_1$ and styrene$_1$ | $S_1$-Li$_1$ |
| (b) | initiator$_2$, styrene$_2$ and butadine$_1$ | $S_1$-B$_1$/S$_2$-Li$_1$<br>B$_1$/S$_2$-Li$_2$ |
| (c) | butadiene$_2$ | $S_1$-B$_1$/S$_2$-B$_2$-Li$_1$<br>B$_1$/S$_2$-B$_2$-Li$_2$ |
| (d) | initiator$_3$ and styrene$_3$ | $S_1$-B$_1$/S$_2$-B$_2$-S$_3$-Li$_1$<br>B$_1$/S$_2$-B$_2$-S$_3$-Li$_2$<br>S$_3$-Li$_3$ |
| (e) | butadiene$_3$ | $S_1$-B$_1$/S$_2$-B$_2$-S$_3$-B$_3$-Li$_1$<br>B$_1$/S$_2$-B$_2$-S$_3$-B$_3$-Li$_2$<br>S$_3$-B$_3$-Li$_3$ |
| (f) | coupling agent | polymodal block copolymers with both styrene and butadiene terminal blocks | where S = styrene block
B = butadiene block
B/S = tapered block
Li = residue from a monoalkali metal initiator remaining on the end of the polymerization chain or reaction site prior to termination or coupling.
subscripts = designation of the numerical order in which that particular component was charged or formed.

TABLE 5

Invention Charging Sequence
(Alternative to Second Embodiment)

| Steps | Components | Resulting Polymer Chains |
|---|---|---|
| (a) | randomizer, initiator$_1$ and styrene$_1$ | $S_1$-Li$_1$ |
| (b) | initiator$_2$ and butadiene$_1$ | $S_1$-B$_1$-Li$_1$<br>B$_1$-Li$_2$ |
| (c) | styrene$_2$ | $S_1$-B$_1$-S$_2$-Li$_1$<br>B$_1$-S$_2$-Li$_2$ |
| (d) | butadiene$_2$ | $S_1$-B$_1$-S$_2$-B$_2$-Li$_1$<br>B$_1$-S$_2$-B$_2$-Li$_2$ |
| (e) | initiator$_3$ and styrene$_3$ | $S_1$-B$_1$-S$_2$-B$_2$-S$_3$-Li$_1$<br>B$_1$-S$_2$-B$_2$-S$_3$-Li$_2$<br>S$_3$-Li$_3$ |
| (f) | butadiene$_3$ | $S_1$-B$_1$-S$_2$-B$_2$-S$_3$-B$_3$-Li$_1$<br>B$_1$-S$_2$-B$_2$-S$_3$-B$_3$-Li$_2$<br>S$_3$-B$_3$-Li$_3$ |
| (g) | coupling agent | polymodal block copolymers with both styrene and butadiene terminal blocks | where S = styrene block
B = butadiene block
Li = residue from a monoalkali metal initiator remaining on the end of the polymerization chain or reaction site prior to termination or coupling.
subscripts = designation of the numerical order in which that particular component was charged or formed.

the charges which has two monomers may be either a mixture of the two monomers or simultaneous charging of two separate monomers.

As can be seen from the intermediate products listed in the charging sequence tables above, in each of the embodiments of the invention there are at least three distinct species of polymer chains before coupling. Thus, polymodal block copolymers comprising relatively high and low molecular weight and different composition species can be produced.

Tapered blocks in each of the growing polymer chains of the first embodiment of the invention and in some of the growing polymer chains of the second embodiment of the invention are produced by simultaneously charging with at least two monomers as shown in the tables of the inventive charging sequences. Two alternatives to the embodiments of this invention have no tapered blocks.

The randomizer regulates randomization and tapering of the monovinylaromatic and conjugated diene monomer copolymerization in a mixed monomer charge. Choice of randomizer can be used to manipulate the degree and direction of taper in the blocks resulting from charges of mixtures of monomers. The taper can be either a graduation from poly(conjugated diene) rich chain to poly(monovinylaromatic) rich chain or a graduation from a poly(monovinylaromatic) rich chain to poly(conjugated diene) rich chain according to preference of the initiator-randomizer complex for one type of monomer over the other. For each of the embodiments of this invention with tapered blocks, a randomizer which will affect a taper from conjugated diene to monovinyl aromatic is chosen.

In each of the embodiments of this invention, prior to coupling, some of the living polymer chains have poly(monovinylaromatic) terminal blocks on one end because of the monovinylaromatic charges made with initiator which started new chains. Others of the living polymer chains have poly(conjugated diene) terminal blocks on the inactive chain end because of the charges of an initiator and a mixture of conjugated diene and monovinylaromatic monomers (in the first and second embodiments) or the charge of a conjugated diene with an initiator (first alternative to first embodiment) or the charge of monovinylaromatic monomer and initiator made in the presence of unpolymerized conjugated diene (second alternative to first embodiment). The living ends of the chains will have poly(conjugated diene) blocks just prior to coupling because of the charge containing conjugated diene monomer made next preceeding the coupling step.

In addition to the sequence of additions of the monomers and of the initiator, it is important to control the amount of each monomer and initiator addition at each stage or increment so that each chain has suitable block sizes and polyvinylaromatic content, and the entire polymer the proper polymodality and breadth of molecular weight distribution.

In any of the embodiments of this invention or alternatives thereto, it is feasible to stretch out over an interval of time the addition of one or more of the increments of initiator, thus spreading (increasing) further the molecular weight distribution of the resulting product upon coupling.

The polymerization process is carried out in a hydrocarbon diluent at any suitable temperature in a range of about $-10°$ to about $150°$ C., preferably in the range of about $0°$ to about $110°$ C., at pressures sufficient to maintain the reaction mixture substantially in the liquid phase. The polymerization is adiabatic so that temperatures and pressures will peak as the heat of polymerization of each monomer charge is liberated and then decrease due to heat removal by the cooling coil when essentially no free monomer is left to react. Appropriate hydrocarbon diluents include aromatic compounds such as benzene or linear and cycloparaffins such as butane, pentane, hexane, octane, cyclohexane, cyclopentane and mixtures thereof. Presently preferred is cyclohexane. Generally, the choice of hydrocarbon or hydrocarbon mixture and the temperature is such that the resulting polymer is in solution.

Small amounts of polar compounds are used to improve the effectiveness of alkylmonoalkali metal initiators such as n-butyllithium. Alkyllithium compounds in hydrocarbon solution are generally associated with tetramers or hexamers which are not effective initiators for monomer polymerization, whereas the monomeric and possibly dimeric species are. Dissociation of the alkylmonoalkali metal initiators therefore affects the rate of polymerization and the presence of polar compounds in the solution assists in that dissociation. The polar compounds also affect partial randomization of the monovinylaromatic/conjugated diene in a mixed monomer polymerization so as to increase the random portion of the tapered block. The polar compounds are generally used in admixture with the hydrocarbon diluent.

The amounts of polar compounds used as randomizers and promoters of initiator effectiveness in this invention will vary according to the reactivity and effectiveness of the particular randomizer used.

The type and amount of polar compounds used as randomizers in the polymerization will also affect the molecular structure of the polydiene in the random copolymer portion of the tapered block segments and in the pure polydiene blocks. For example, increasing the amount of tetrahydrofuran used in the process will increase the proportion of diene monomer polymerized by 1,2 (vinyl) or 3,4 (isopropenyl in the case of isoprene) addition relative to 1,4 addition. When polymer having a very high proportion of 1,2 or 3,4 addition is desired, larger amounts of tetrahydrofuran are used. However, use of too much randomizer can result in excessive polymer-lithium termination during polymerization and/or poor stability of the polymer and/or undesired side reactions, depending upon the choice of randomizer. Use of too little randomizer would result in inefficient initiator use, compositional variations and broader molecular weight distribution.

With certain of the embodiments, some restriction must be placed on the amount of randomizer to maintain transparency in the coupled product for the following reasons. For example, when combined with the alkyllithium initiator, potassium alkoxide randomizer will change the preference of the growing, active end of the polymer chain for monomer from conjugated diene to monovinylaromatic monomer. Depending on the amount of potassium compound added, the normal B/S tapered block from a mixed monomer charge can be changed to a block with more random copolymer and slightly less polyvinylaromatic block, monovinylaromatic hydrocarbon, or to a uniformly random B/S block, or to a tapered random copolymer starting with high monovinylaromatic content and ending with high conjugated diene content. With other polar additives at high levels, combined monomer charges will result in the production of a random rather than tapered copolymer block.

The first embodiment and the second alternative to the first embodiment of this invention have a $B_2/S_3$—$B_3$— chain originating from the third initiator charge. This chain will not haze the final product provided the starting polydiene and random copolymer segment of the tapered block are not too long and the monovinylaromatic block attached to the end of the tapered copolymer block is substantial. With moderate levels of potassium alkoxides or relatively high levels of other polar randomizers, this normally tapered block will be a random copolymer block which, when connected to the final poly-$B_3$ block, will result in creation of a polymeric species with complete rubbery character without an attached monovinylaromatic block. The final coupled polymer always contains some simple uncoupled, terminated polymer species, and this material (in this case a random copolymer-polydiene type of diblock copolymer) would be incompatible with the polymonovinylaromatic domain and could form particles in the block polymer matrix large enough to be visible. The same could be said for the intraspecies coupled polymer from the third initiator. Since visible particles would have a refractive index quite different from that of the bulk of the resin, the particles would very likely haze the resin. In these two embodiments, the amount of randomizer should be restricted to an amount insufficient to randomize the mixed monomer charge.

The initial monovinylaromatic charge is made with the randomizer present for the additional effect of causing the monovinylaromatic component resulting from each initiator charge to be of relatively narrow molecular weight distribution. In the two embodiments of the invention and alternatives thereto, by varying the amounts of initiator, the differences in molecular weights of the monovinylaromatic or conjugated diene components resulting from each of the charges having initiator can be increased, thereby broadening the molecular weight distribution of the total polymer.

In each of the two embodiments of the invention and alternatives thereto, amounts of initiator employed are those which will produce resins with desirable melt flow which can be used in blends to make articles with a good balance of properties including high blueness values, good impact strength, good environmental stress crack resistance and flexural modulus. Presently preferred are amounts of initiator in each of the initiator charges sufficient to obtain a block copolymer having a melt flow ranging from about 2 to about 50 g/10 minutes, more preferably from about 4 to about 30 g/10 minutes, and most preferably from about 5 to about 20 g/10 minutes, as determined by ASTM D1238-73, condition 200/5.0. The amounts of initiator contemplated as useful in each of the charges having initiator are shown in Tables 6, 7 and 8.

Use of too small an amount of initiator would result in high molecular weight polymers. Conversely, use of too large an amount of initiator would result in polymers having short chain polymeric species and low molecular weight.

Varying the weight ratios of amounts of the initiator charges will result in variations of the proportionate amounts of species present in the copolymer. Other factors affecting the proportionate amounts of species present in the copolymer include presence of impurities and/or scavengers in the reactor, effectiveness of the polar randomizer as a promoter and choice of coupling agent(s).

The polymerization is carried out in adiabatic conditions with a substantial absence of oxygen and water, preferably under an inert gas atmosphere. Prior to the coupling step, the reaction mass contains a very high percentage of molecules (polymer chains) in which an alkali metal cation is positioned at one end of each polymer chain. Impurities in the feed such as water or alcohol reduce the amounts of monoalkali metal polymer in the reaction mass.

After essentially complete polymerization of the final charge added to the polymerization reaction, one or more suitable difunctional or polyfunctional coupling agents is added. As used here, the term "coupling" means the bringing together and joining, by means of one or more central coupling atoms or coupling moieties, two or more of the living monoalkali metal-terminated polymer chains.

Any effective amount of the coupling agent can be employed. While the amount is not believed to be particularly critical, with the exception of the di- or multivinylaromatic compounds, a stoichiometric amount of coupling agent relative to the active polymer-alkali metal tends to promote maximum coupling as a generality. Presently preferred is an amount of coupling agent slightly greater than stoichiometric relative to the active polymer-alkali metal. However, less than stoichiometric amounts can be used for higher degrees of coupling where desired for particular products of broadened molecular weight distribution.

The degree of coupling with di- and multivinylaromatics increases with the amount of coupling agent used. Generally, the amount of coupling agent employed tends to be limited to amounts that do not cause gelation of the resin. Polymers with a large number of branches off of a central core of oligermerized coupling agent can be produced. In practice, this capability must be moderated in order to obtain polymers processable in conventional molding equipment. Molecular weights of the polymers to be coupled can be lowered to allow more extensive coupling, but the polymer-lithium species must have sufficiently high molecular weight for the polymonovinylaromatic blocks to have a glass transition temperature above about 80° C. or the polymers will not develop the green strength needed for most molding applications. The amount of this type coupling agent is best described in terms of a molar ratio of di- or multivinylaromatic to polymer-lithium of from about 0.1:1 to about 4:1.

Typically, in each of the embodiments of this invention, the total amount of coupling agent, other than the di- and multivinylaromatics, is in the range of about 0.005 to about 10 phm (parts per 100 parts of total monomers employed in the polymerization). Preferred when most combinations of monomers and coupling agents are used to practice this invention is about 0.2 to about 0.6 phm of coupling agent, depending upon choice of coupling agent and amounts of initiator used. Presently most preferred is about 0.3 to about 0.5 phm, depending upon choice of coupling agent and amounts of initiator used. Use of an insufficient amount of coupling agent will result in less complete coupling of the living polymer chains or, depending upon choice of coupling agent, more branching; use of an excessive amount of coupling agent can lower both coupling efficiency and degree of coupling.

At the conclusion of the coupling process, the coupled polymer may still contain bound polymeric alkali metal alkoxides or active polymer-alkali metal, depending on the type of coupling agent employed. The system is treated with an active compound such as water, alcohol, phenols, carbon dioxide or linear saturated aliphatic mono- and dicarboxylic acids to remove any remaining alkali metal from the copolymer chain.

Stabilization agents can be added to provide oxidative stability for the polymer during processing and handling and subsequent long term use. Commonly used stabilization processes can use a combination of antioxidants which include, but are not limited to, a hindered phenol and an organophosphite, particular examples of which are octadecyl 3-(3′,5′-di-t-butyl-4′-hydroxyphenyl) propionate and tris-(nonylphenyl)-phosphite.

After stabilization, the hydrocarbon diluent is then flashed from the polymer solution to increase the solids content. Flashing of the polymer cement may be followed by desolventizing extrusion with vacuum in commercial production or by other vacuuming processes to achieve consistent solvent content of less than 0.3 weight percent.

The resinous polymodal copolymer products can be compounded with antioxidants, anti-blocking agents, release agents and other additives, as known in the compounding arts. The invention can also be filled or reinforced with fillers and reinforcing agents known in the art. The products of this invention can be used in blends with such materials as polystyrene, acrylonitrile-butadiene-styrene copolymers, styrene-acrylonitrile copolymers, and other styrenic copolymers. When less transparency is desired or transparency is not necessary, the invention copolymers can be blended with high impact polystyrene, polyolefins and/or olefin copolymers.

Typical charging sequences and useful ranges of amounts of the charges for each of the two embodiments of this invention and the alternatives thereto are given in Tables 6, 7 and 8.

TABLE 6

Ranges of Amounts of Components in a Typical Invention Charging Sequence (First Embodiment)

| Step | Component[a] | Broad Range | Preferred Range | More Preferred Range |
|---|---|---|---|---|
| (a) | randomizer[b], phm | 0.001–3 | 0.005–1.5 | 0.015–0.3 |
|  | initiator, phm | 0.005–1.5 | 0.01–0.1 | 0.02–0.05 |
|  | and monovinylarene monomer, phm | 20–60 | 25–50 | 32–45 |
| (b) | initiator, phm | 0.005–3 | 0.01–1.5 | 0.015–0.3 |
|  | and monovinylarene monomer, phm | 10–30 | 12–20 | 14–18 |
| (c) | conjugated diene monomer, phm | 2–15 | 2–12 | 3–8 |
| (d) | initiator, phm | 0.04–0.2 | 0.06–0.14 | 0.08–0.12 |
|  | monovinylarene monomer, phm | 15–30 | 17–27 | 19–25 |
|  | and conjugated diene monomer, phm | 2–15 | 2–12 | 3–8 |
| (e) | conjugated diene monomer, phm | 8–22 | 10–20 | 12–18 |
| (f) | coupling agent, phm | 0.005–1010 | 0.2–0.6[c] | 0.3–0.5[c] |

[a]Monomer within each charge having more than one monomer can be added simultaneously or as a mixture, slowly or quickly. Randomizer in charge (a) may be already present in the diluent or added as a separate charge.
[b]To achieve high vinyl content in the polydiene, up to 3 phm randomizer may be used. When randomizers other than THF, such as diethylether, are used, considerably larger amounts are generally needed.
[c]Range appropriate for the non-multivinylaromatic coupling agents. Di-vinyl and multivinylaromatics would be used in smaller amounts.

TABLE 7

Ranges of Amounts of Components in a Typical Invention Charging Sequence (Second Alternative to First Embodiment)

| Step | Component[a] | Broad Range | Preferred Range | More Preferred Range |
|---|---|---|---|---|
| (a) | randomizer[b], phm | 0.001–3 | 0.005–1.5 | 0.015–0.3 |
|  | initiator, phm | 0.005–1.5 | 0.01–0.1 | 0.02–0.05 |

TABLE 7-continued

Ranges of Amounts of Components in a Typical Invention Charging Sequence (Second Alternative to First Embodiment)

| Step | Component[a] | Broad Range | Preferred Range | More Preferred Range |
|---|---|---|---|---|
| | and monovinylarene monomer, phm | 20–60 | 25–50 | 32–45 |
| (b) | initiator, phm | 0.005–3 | 0.01–1.5 | 0.015–0.3 |
| | and monovinylarene monomer, phm | 10–30 | 12–20 | 14–18 |
| (c) | conjugated diene monomer, phm | 2–15 | 2–12 | 3–8 |
| (d) | initiator, phm | 0.04–0.2 | 0.06–0.14 | 0.08–0.12 |
| | and monovinylarene monomer, phm | 15–30 | 17–27 | 19–25 |
| (e) | conjugated diene monomer, phm | 8–22 | 10–20 | 12–18 |
| (f) | coupling agent, phm | 0.005–1010 | 0.2–0.6[c] | 0.3–0.5[c] |

[a]Monomer within each charge having more than one monomer can be added simultaneously or as a mixture, slowly or quickly. Randomizer in charge (a) may be already present in the diluent or added as a separate charge.
[b]To achieve high vinyl content in the polydiene, up to 3 phm randomizer may be used. When randomizers other than THF, such as diethylether, are used, considerably larger amounts are generally needed.
[c]Range appropriate for the non-multivinylaromatic coupling agents. Di-vinyl and multivinylaromatics would be used in smaller amounts.

TABLE 8

Ranges of Amounts of Components in a Typical Invention Charging Sequence (Second Embodiment)

| Step | Component[a] | Broad Range | Preferred Range | More Preferred Range |
|---|---|---|---|---|
| (a) | randomizer[b], phm | 0.001–3 | 0.005–1.5 | 0.015–0.3 |
| | initiator, phm | 0.005–1.5 | 0.01–0.1 | 0.02–0.05 |
| | and monovinylarene monomer, phm | 20–60 | 25–50 | 32–45 |
| (b) | initiator, phm | 0.005–3 | 0.01–1.5 | 0.015–0.3 |
| | and monovinylarene monomer, phm and conjugated diene monomer, phm | 10–30 / 1–12 | 12–20 / 2–20 | 14–18 / 3–8 |
| (c) | conjugated diene monomer, phm | 1–12 | 2–10 | 4–8 |
| (d) | initiator, phm | 0.04–0.2 | 0.06–0.14 | 0.08–0.12 |
| | and monovinylarene monomer, phm | 8–22 | 10–18 | 12–16 |
| (e) | conjugated diene monomer, phm | 10–30 | 12–25 | 16–22 |
| (f) | coupling agent, phm | 0.005–1010 | 0.2–0.6[c] | 0.3–0.5[c] |

[a]Monomer within each charge having more than one monomer can be added simultaneously or as a mixture, slowly or quickly. Randomizer in charge (a) may be already present in the diluent or added as a separate charge.
[b]To achieve high vinyl content in the polydiene, up to 3 phm randomizer may be used. When randomizers other than THF, such as diethylether, are used, considerably larger amounts are generally needed.
[c]Range appropriate for the non-multivinylaromatic coupling agents. Di-vinyl and multivinylaromatics would be used in smaller amounts.

After coupling, at least the following coupled and uncoupled polymeric species shown in Table 9 are present in the polymodal polymers of the first embodiment of this invention.

TABLE 9

Polymeric Species Present in First Embodiment $S_1$-$S_2$-$B_1$-$B_2$/$S_3$-$B_3$-x-$B_3$-$S_3$/$B_2$-$B_1$-$S_2$-$S_1$
$S_2$-$B_1$-$B_2$/$S_3$-$B_3$-x-$B_3$-$S_3$/$B_2$-$B_1$-$S_2$
$B_2$/$S_3$-$B_3$-x-$B_3$-$S_3$/$B_2$
$S_1$-$S_2$-$B_1$-$B_2$/$S_3$-$B_3$-x-$B_3$-$S_3$/$B_2$-$B_1$-$S_2$
$S_1$-$S_2$-$B_1$-$B_2$/$S_3$-$B_3$-x-$B_3$-$S_3$/$B_2$
$S_2$-$B_1$-$B_2$/$S_3$-$B_3$-x-$B_3$-$S_3$/$B_2$
$S_1$-$S_2$-$B_1$-$B_2$/$S_3$-$B_3$
$S_2$-$B_1$-$B_2$/$S_3$-$B_3$

TABLE 9-continued

Polymeric Species Present in First Embodiment $B_2$/$S_3$-$B_3$ wherein
S = monovinylarene block
B = conjugated diene block
B/S = tapered block
x = coupling moiety or coupling site
subscripts = indications of the charges which were the source of the polymer blocks.

After coupling, at least the following coupled and uncoupled polymeric species shown in Table 10 are present in the polymodal polymers of the first embodiment of this invention.

TABLE 10

Polymeric Species Present in First Alternative to First Embodiment $S_1$-$S_2$-$B_1$-$B_2$-$S_3$-$B_3$-x-$B_3$-$S_3$-$B_2$-$B_1$-$S_2$-$S_1$
$S_2$-$B_1$-$B_2$-$S_3$-$B_3$-x-$B_3$-$S_3$-$B_2$-$B_1$-$S_2$
$B_2$-$S_3$-$B_3$-x-$B_3$-$S_3$-$B_2$
$S_1$-$S_2$-$B_1$-$B_2$-$S_3$-$B_3$-x-$B_3$-$S_3$-$B_2$-$B_1$-$S_2$
$S_1$-$S_2$-$B_1$-$B_2$-$S_3$-$B_3$-x-$B_3$-$S_3$-$B_2$
$S_2$-$B_1$-$B_2$-$S_3$-$B_3$-x-$B_3$-$S_3$-$B_2$
$S_1$-$S_2$-$B_1$-$B_2$-$S_3$-$B_3$
$S_2$-$B_1$-$B_2$-$S_3$-$B_3$
$B_2$-$S_3$-$B_3$ wherein
S = monovinylaromatic block
B = conjugated diene block
x = coupling moiety or coupling site
subscripts = indications of the charges which were the source of the polymer blocks.

After coupling, at least the following coupled and uncoupled polymeric species shown in Table 11 are present in the polymodal polymers of the second alternative to the first embodiment of this invention.

TABLE 11

Polymeric Species Present in Second Alternative to First Embodiment $S_1$-$S_2$-$B_1$-($B_1$)/$S_3$-$B_2$-x-$B_2$-$S_3$/($B_1$)-$B_1$-$S_2$-$S_1$
$S_2$-$B_1$-($B_1$)/$S_3$-$B_2$-x-$B_2$-$S_3$/($B_1$)-$B_1$-$S_2$
($B_1$)/$S_3$-$B_2$-x-$B_2$-$S_3$/($B_1$)
$S_1$-$S_2$-$B_1$-($B_1$)/$S_3$-$B_2$-x-$B_2$-$S_3$/($B_1$)-$B_1$-$S_2$
$S_1$-$S_2$-$B_1$-($B_1$)/$S_3$-$B_2$-x-$B_2$-$S_3$/($B_1$)
$S_2$-$B_1$-($B_1$)/$S_3$-$B_2$-x-$B_2$-$S_3$/($B_1$)
$S_1$-$S_2$-$B_1$-($B_1$/)$S_3$-$B_2$
$S_2$-$B_1$-($B_1$/)$S_3$-$B_2$
($B_1$/)$S_3$-$B_2$ wherein
S = monovinylaromatic block
B = conjugated diene block
(B)/S = tapered block formed with unreacted conjugated diene from previous monomer charge.
x = coupling moiety or coupling site
subscripts = indications of the charges which were the source of the polymer blocks.

After coupling, at least the following coupled and uncoupled polymeric species shown in Table 12 are present in the polymer of the second embodiment of this invention.

TABLE 12

Polymeric Species Present in Second Embodiment $S_1$-$B_1$/$S_2$-$B_2$-$S_3$-$B_3$-x-$B_3$-$S_3$-$B_2$-$S_2$/$B_1$-$S_1$
$B_1$/$S_2$-$B_2$-$S_3$-$B_3$-x-$B_3$-$S_3$-$B_2$-$S_2$/$B_1$
$S_3$-$B_3$-x-$B_3$-$S_3$
$S_1$-$B_1$/$S_2$-$B_2$-$S_3$-$B_3$-x-$B_3$-$S_3$-$B_2$-$S_2$/$B_1$
$S_1$-$B_1$/$S_2$-$B_2$-$S_3$-$B_3$-x-$B_3$-$S_3$
$B_1$/$S_2$-$B_2$-$S_3$-$B_3$-x-$B_3$-$S_3$
$S_1$-$B_1$/$S_2$-$B_2$-$S_3$-$B_3$
$B_1$/$S_2$-$B_2$-$S_3$-$B_3$

TABLE 12-continued

Polymeric Species Present in Second Embodiment $S_3\text{-}B_3$ wherein
S = monovinylarene block
B = conjugated diene block
B/S = tapered block
x = coupling moiety or coupling site
subscripts = designation of the numerical order in which the particular polymer blocks were charged or formed.

After coupling, at least the following coupled and uncoupled polymeric species shown in Table 13 are present in the polymer of the alternative to the second embodiment.

TABLE 13

Polymeric Species Present in Alternative to Second Embodiment $S_1\text{-}B_1\text{-}S_2\text{-}B_2\text{-}S_3\text{-}B_3\text{-}x\text{-}B_3\text{-}S_3\text{-}B_2\text{-}S_2\text{-}B_1\text{-}S_1$
$B_1\text{-}S_2\text{-}B_2\text{-}S_3\text{-}B_3\text{-}x\text{-}B_3\text{-}S_3\text{-}B_2\text{-}S_2\text{-}B_1$
$S_3\text{-}B_3\text{-}x\text{-}B_3\text{-}S_3$
$S_1\text{-}B_1\text{-}S_2\text{-}B_2\text{-}S_3\text{-}B_3\text{-}x\text{-}B_3\text{-}S_3\text{-}B_2\text{-}S_2\text{-}B_1$
$S_1\text{-}B_1\text{-}S_2\text{-}B_2\text{-}S_3\text{-}B_3\text{-}x\text{-}B_3\text{-}S_3$
$B_1\text{-}S_2\text{-}B_2\text{-}S_3\text{-}B_3\text{-}x\text{-}B_3\text{-}S_3$
$S_1\text{-}B_1\text{-}S_2\text{-}B_2\text{-}S_3\text{-}B_3$
$B_1\text{-}S_2\text{-}B_2\text{-}S_3\text{-}B_3$
$S_3\text{-}B_3$ wherein
S = monovinylarene block
B = conjugated diene block
x = coupling moiety or coupling site
subscripts = designation of the numerical order in which the particular polymer blocks were charged or formed.

In each of the embodiments, depending upon choice and amount of coupling agent or agents and whether coupling agents are charged as a mixture or incrementally, there can be present other polymeric species with varying degrees of branching.

The compositions of this invention or blends thereof can be extruded, thermoformed, injection molded, blow molded, or made into film or sheet. Articles made from the compositions of this invention are transparent with high blueness, have good impact strength and have other physical properties within acceptable ranges for such applications as toys, displays, drinking cups, lids, bottles, other food containers, shrink wrap and over wrap. High blueness is considered to be the amount of tint which will result in a Hunter −b value of at least |3| when measured according to the method described in the test procedures stated hereinafter. For this invention, depending upon application, polymers having a Hunter −b value of at least |5| is generally preferable, and a Hunter −b value of at least |7| is most preferable. Polymers from which can be made attractive transparent or translucent blue articles may have Hunter −b absolute values as large as 25 or more. Articles made from blends of the copolymers of this invention can economically provide advantageous properties for applications similar to those of the neat polymers.

Test Procedures

The blueness values (tristumulas value "b") were determined on a Model D 25 Hunter Lab Color Difference Meter. Blueness values are a measure of blue tint expressed as −b, where larger absolute numbers indicate more blueness. In each example, reported blueness (Hunter "b") values for injection molded test specimens are for the average of three readings on three stacked 0.050″ by 2.5″ diameter injection molded disks. Disks were injection molded at 350° F./30 tons/2 minutes. Measurements were made against a black background.

Other properties were tested using ASTM procedures as shown in Table 14.

TABLE 14

| Test Procedures Used | |
|---|---|
| Property | ASTM Method |
| Flow rate, g/10 min Condition 200° C./5.0 kg | D 1238-88 |
| Haze, % | D 1003-61 (1990) |
| Shore D hardness | D 2240-91 |
| Tensile strength at yield and break, ksi | D 638-91 at 50 mm/min Type I test specimens |
| Elongation at yield and break, % | D 638-91 at 50 mm/min |
| Flexural modulus, ksi | D 790-92 |
| Flexural strength, ksi | D 790-92 |
| Izod impact strength, notched, ft-lb/in | D 256-88 |

EXAMPLES

The following examples will describe in more detail the experimental process used and the polymodal block copolymers with both vinylaromatic and conjugated diene terminal blocks obtained as a result of the invention processes. These examples should be taken as illustrative and not restrictive.

Styrene and butadiene were chosen as monomers to exemplify the invention, and randomizer, initiator, coupling agent and diluent appropriate for these monomers were used. Quantities of reagents are usually expressed in parts per hundred monomer (phm) based on the total weight of monovinylaromatic and conjugated diene employed.

Example I

This example describes nine invention polymerization runs (1–9) that were carried out to produce resinous polymodal, coupled, tapered block styrene-butadiene copolymers, each of which has some polymeric species with resinous terminal blocks and some polymeric species with at least one diene terminal block. These runs exemplify the first embodiment of the invention.

Styrene (from ARCO Chemical) and 1,3-butadiene (from Phillips Petroleum Company) were dried by passage over activated alumina (Kaiser A-201), and then copolymerized and coupled in a 6-stage process using n-butyllithium initiator (from Foote).

Polymerization runs were carried out under nitrogen in a stirred, jacketed, stainless steel 2-gallon reactor employing essentially anhydrous reactants and conditions. Polymerizations were run adiabatically once initiated, and the initiation temperature was kept between 40° C. and 45° C.

Solvent, monomers and initiator were charged directly into the reactor with quantities being gravimetrically determined. The randomizer (THF) was charged volumetrically. The anhydrous mixtures were stirred continuously during the polymerization process. The cyclohexane diluent, which contained 0.04 phm tetrahydrofuran (THF) in each polymerization in this example, was preheated to about 50° C. before monomers were charged to the reactor. The n-butyllithium was charged as a 2 weight percent solution in cyclohexane. In the polymerization step in which both butadiene and styrene were charged, they were charged simultaneously as a mixture.

In the coupling step, the Vikoflex ® 7170 coupling agent used was an epoxidized vegetable oil commercially available from Atochem Chemical Company. The coupling agent was charged as a 50 percent (weight/volume) solution in cyclohexane. In the terminating step, water was added in an amount slightly in stoichiometric excess of the initiator to terminate the polymerization. Carbon dioxide from a pressurized container was also admitted to provide about 0.4 phm carbon dioxide to the reactor.

The antioxidant mixture added in the stabilizing step contained a hindered phenol [octadecyl 3-(3',5'-di-t-butyl-4'-hydroxyphenyl) propionate, commercially available as Irganox ® 1076 from Ciba-Geigy] and an organic phosphite [tris(nonylphenyl) phosphite, available as TNPP or Weston 399B from GE Specialty Chemicals]. Enough of each antioxidant was charged volumetrically to the reactor to provide 0.25 phm hindered phenol and 1 phm organic phosphite.

After each addition of monomer, initiator or additive, the feed lines were rinsed with approximately 4.5 phm cyclohexane solvent and cleared with a nitrogen sparge.

Following the stabilization step, each copolymer solution was transferred to a 5-gallon blowdown reactor and anti-blocking agent was added. The anti-blocking agent was BE Square ® wax available from Petrolite Chemical Company in Barnsdall, Okla. The copolymer solution was heated and then flashed at about 178°–180° C. to remove a portion of the diluent. Substantially all of the remaining diluent was removed in a vacuum oven at 85° C. for one hour. The resulting polymer was chopped in a granulator into crumb and then dried for an additional hour in a vacuum oven.

Polymers from the polymerization runs were pelletized with a ¾" Killion extruder with all zones and adapter set at 180° C. A general purpose feed screw, Killion design 8-8-8 (0.180"–0.060"), was used at a screw speed of 70 RPM for this process. The pelletized polymers were injection molded on an Arburg Model Allrounder 221-75-350 with a front temperature of 220° C. and middle, back, and nozzle temperatures of 210° C. The mold temperature was maintained at about 26° C. (78° F.).

In each of the nine runs (1–9), 2000 g total monomers (butadiene and styrene) were used. About 76 weight percent of the total amount of cyclohexane diluent (3130 g) was charged initially. The remaining cyclohexane diluent was added during the run as a diluent or flush for the various reactants added in subsequent steps. In runs 1–8, the weight ratio of total monomers charged was 75/25 styrene/butadiene; in run 9 the weight ratio of total monomers charged was 76/24 styrene/butadiene.

The sequences and amounts of charges used in each of the runs are shown in Tables 15 and 16. Tapered butadiene/styrene blocks were formed in step 4 by simultaneously charging a mixture of both butadiene and styrene monomers. The charging sequence used was i, $S_1$, i, $S_2$, $B_1$, i, $B_2/S_3$, $B_3$, coupling agent. The monomer weight ratios corresponding to the $S_1$, $S_2$, $B_1$, $B_2/S_3$, $B_3$ sequence were 37, 16, from 3 to 8, from 2/22 to 7.3/22, from 12 to 19.

The devolatilized copolymers from runs 1 through 9 were designated invention copolymers 1, 2, 3, 4, 5, 6, 7, 8 and 9, and had melt flows ranging from 9.9 g/10 min (run 9) to 24.2 g/10 min (run 3). It is believed that the differences in melt flow were attributable to differences in amounts of initiator used in each of the four runs.

TABLE 15

| Components[a] | Invention Runs - First Embodiment | | | |
|---|---|---|---|---|
| | Run 1 | Run 2 | Run 3 | Run 4 |
| Step 1 | | | | |
| Cyclohexane, phm | 145 | 145 | 154 | 154 |
| Tetrahydrofuran, phm | 0.04 | 0.04 | 0.04 | 0.04 |
| n-Butyllithium initiator, phm | 0.03 | 0.034 | 0.030 | 0.031 |
| Styrene, phm | 37 | 37 | 37 | 37.02 |
| Polymerization Time, min | 15[b] | 17 | 17 | 17 |
| Peak Polymerization Temperature, °C. | 75 | 70 | 76 | 69 |
| Step 2 | | | | |
| n-Butyllithium initiator, phm | 0.033 | 0.031 | 0.03 | 0.031 |
| Styrene, phm | 16 | 16 | 16 | 16.02 |
| Polymerization Time, min | 15[b] | 15 | 17 | 15 |
| Peak Polymerization Temperature, °C. | 73 | 69 | 71 | 70 |
| Step 3 | | | | |
| Butadiene, phm | 6 | 5 | 3 | 5.47 |
| Polymerization Time, min | 19 | 18 | 18 | 18 |
| Peak Polymerization Temperature, °C. | 68 | 64 | 62 | 63 |
| Step 4 | | | | |
| n-Butyllithium initiator, phm | 0.1 | 0.102 | 0.1 | 0.104 |
| Butadiene, phm | 2 | 2 | 5 | 7.34 |
| Styrene, phm | 22 | 22 | 22 | 22.08 |
| Polymerization Time, min | 20 | 21 | 19 | 24 |
| Peak Polymerization Temperature, °C. | 84 | 83 | 83 | 87 |
| Step 5 | | | | |
| Butadiene, phm | 17 | 18 | 17 | 12.07 |
| Polymerization Time, min | 31 | 20 | 32 | 20 |
| Peak Polymerization Temperature, °C. | 98 | 101 | 100 | 91 |
| Step 6 (Coupling) | | | | |
| Vikoflex 7170, phm | 0.4 | 0.4 | 0.4 | 0.4 |
| Time, min | 20 | 17 | 17 | 48 |
| Temperature, °C. | 96 | — | 89 | 90 |
| Step 7 (Terminating) | | | | |
| Water, phm | 0.2 | 0.2 | 0.3 | 0.3 |
| Carbon Dioxide, phm | 0.4 | 0.4 | 0.4 | 0.4 |
| Time, min | 30 | 31 | 34 | 27 |
| Temperature, °C. | 98 | 89 | 102 | 99 |
| Step 8 (Stabilizing) | | | | |
| Stabilizer Mixture, phm | 1.25 | 1.25 | 1.25 | 1.25 |
| Temperature, °C. | 102 | 88 | 102 | 99 |
| Step 9 | | | | |
| Wax, phm[c] | 0.15 | 0.15 | 0.15 | 0.11 |
| Recovered Resin | | | | |
| Melt Flow, g/10 min | 12.6 | 15.1 | 24.2 | 23.2 |

[a]After each addition of monomer, initiator or additive, the feed lines were rinsed with approximately 4–6 phm cyclohexane diluent and cleared with nitrogen.
[b]Estimated value.
[c]Added in the blowdown tank.

TABLE 16

| Components[a] | Invention Runs - First Embodiment | | | | |
|---|---|---|---|---|---|
| | Run 5 | Run 6 | Run 7 | Run 8 | Run 9 |
| Step 1 | | | | | |
| Cyclohexane, phm | 154 | 154 | 154 | 145 | 154 |
| Tetrahydrofuran, phm | 0.04 | 0.04 | 0.04 | 0.04 | 0.04 |
| n-Butyllithium initiator, phm | 0.030 | 0.030 | 0.030 | 0.030 | 0.029 |
| Styrene, phm | 37 | 36.9 | 37 | 37 | 36 |
| Polymerization Time, min | 16 | 16 | 21 | 11 | 17 |
| Peak Polymerization Temperature, °C. | 75 | 81 | 78 | 63 | 78 |
| Step 2 | | | | | |

TABLE 16-continued

Invention Runs - First Embodiment

| Components[a] | Run 5 | Run 6 | Run 7 | Run 8 | Run 9 |
|---|---|---|---|---|---|
| n-Butyllithium initiator, phm | 0.030 | 0.030 | 0.030 | 0.030 | 0.029 |
| Styrene, phm | 16 | 16 | 16 | 16 | 16 |
| Polymerization Time, min | 14 | 12 | 17 | 12 | 14 |
| Peak Polymerization Temperature, °C. | 72 | 78 | 75 | 64 | 77 |
| Step 3 | | | | | |
| Butadiene, phm | 5.5 | 5.6 | 8 | 4 | 6 |
| Polymerization Time, min | 18 | 19 | 18 | 18 | 18 |
| Peak Polymerization Temperature, °C. | 66 | 74 | 74 | 57 | 74 |
| Step 4 | | | | | |
| n-Butyllithium initiator, phm | 0.100 | 0.086 | 0.099 | 0.100 | 0.098 |
| Butadiene, phm | 2.5 | 2.5 | 5 | 2 | 2 |
| Styrene, phm | 22 | 22 | 22 | 22 | 22 |
| Polymerization Time, min | 17 | 22 | 20 | 19 | 19 |
| Peak Polymerization Temperature, °C. | 85 | 91 | 94 | NR[b] | 92 |
| Step 5 | | | | | |
| Butadiene, phm | 17 | 17 | 12 | 19 | 18 |
| Polymerization Time, min | 18 | 20 | 18 | 25 | 30 |
| Peak Polymerization Temperature, °C. | 96 | 100 | 94 | 77 | 103 |
| Step 6 (Coupling) | | | | | |
| Vikoflex 7170, phm | 0.4 | 0.4 | 0.4 | 0.4 | 0.4 |
| Time, min | 16 | 20 | 16 | 26 | 18 |
| Temperature, °C. | 92 | 92 | 97 | 98 | 93 |
| Step 7 (Terminating) | | | | | |
| Water, phm | 0.3 | 0.3 | 0.3 | 0.2 | 0.3 |
| Carbon Dioxide, phm | 0.4 | 0.4 | 0.4 | 0.4 | 0.4 |
| Time, min | 32 | 31 | 28 | 32 | 26 |
| Temperature, °C. | 97 | 100 | 100 | NR[b] | 102 |
| Step 8 (Stabilizing) | | | | | |
| Stabilizer Mixture, phm | 1.25 | 1.25 | 1.25 | 1.25 | 1.25 |
| Temperature, °C. | NR[b] | 100 | 101 | NR[b] | 101 |
| Step 9 | | | | | |
| Wax, phm | 0.15 | 0.15 | 0.15 | 0.15 | 0.15 |
| Recovered Resin | | | | | |
| Melt Flow, g/10 min | 18.4 | 12.9 | 15.3 | 14.0 | 9.7 |

[a]After each addition of monomer, initiator or additive, the feed lines were rinsed with approximately 4–6 phm cyclohexane diluent and cleared with nitrogen.
[b]Not Recorded.

Injection molded test specimens of each of the nine polymers were evaluated and the results shown in Tables 17 and 18 were obtained.

TABLE 17

Physical Properties of Test Specimens Made from Invention Polymer (First Embodiment)

| | Invention Polymer 1 | Invention Polymer 2 | Invention Polymer 3 | Invention Polymer 4 |
|---|---|---|---|---|
| Melt flow, g/10 min | 12.6 | 15 | 24.2 | 23.2 |
| Hunter blueness, b | −10.0 | −11.5 | −14.3 | −21.5 |
| Haze, % | 1.6 | 1.6 | 1.5 | 2.8 |
| Notched Izod, ft-lb/in | 0.8 | 0.9 | 0.5 | 0.8 |
| Tensile strength at break, ksi | 3.56 | 3.35 | 2.96 | 2.46 |
| Tensile strength at yield, ksi | 3.19 | 2.7 | 2.68 | 2.04 |
| Elongation at break, % | 203 | 230 | 217 | 195 |
| Elongation at yield, % | 3.73 | 3.73 | 3.94 | 4.8 |
| Flexural modulus, ksi | 157 | 150 | 154 | 99 |
| Flexural strength, ksi | 3.39 | 3.04 | 3.15 | 2.12 |
| Shore D hardness | 65 | 63 | 64 | 64 |

| | Invention Polymer 5 | Invention Polymer 6 | Invention Polymer 7 | Invention Polymer 8 | Invention Polymer 9 |
|---|---|---|---|---|---|
| Melt flow, g/10 min | 18.4 | 12.9 | 15.3 | 14.0 | 9.7 |
| Hunter blueness, b | −10.2 | −8.2 | −9.2 | −17.6 | −12.2 |
| Haze, % | 1.2 | 2.2 | 1.1 | 2.5 | 1.5 |
| Notched Izod, ft-lb/in | 0.6 | 0.5 | 0.4 | 11.23 | 1.1 |
| Tensile strength at break, ksi | 3.3 | 3.72 | 3.05 | 2.72 | 3.64 |
| Tensile strength at yield, ksi | 3.05 | 3.43 | 2.63 | 2.25 | 3.26 |
| Elongation at break, % | 224 | 222 | 234 | 172 | 198 |
| Elongation at yield, % | 3.73 | 3.73 | 3.94 | 3.94 | 3.73 |
| Flexural modulus, ksi | 163 | 205 | 158 | 113 | 155 |
| Flexural strength, ksi | 3.63 | 4.91 | 3.43 | 2.16 | 3.25 |
| Shore D hardness | 65 | 68 | 64 | 64 | 63 |

Example II

To demonstrate the first alternative to the first embodiment of this invention, four more polymerization runs (10–13) were carried out according to the procedures described in Example I, with the exception that the sequences and amounts of charges were as shown in Table 18. Sequential charges of butadiene and styrene were used in place of the mixture of butadiene and styrene monomers in step 4 of the first embodiment in Example I. The monomer addition sequence was i, $S_1$, i, $S_2$, $B_1$, i, $B_2$, $S_3$, $B_3$ followed by coupling; the monomer ratios were 37, 16, 3 to 5.5, 2.5 to 5, 22, 17. The polymers were 75 percent styrene and 25 percent butadiene.

The copolymers produced in the four runs were designated invention copolymers 10, 11, 12, and 13, and had melt flows of 19.4, 14.3, 12.8 and 14.8 g/10 min., respectively. The polymerizations of invention runs 10, 11, 12 and 13 are shown in Table 18.

TABLE 18

Invention Runs - First Alternative to First Embodiment

| Components[a] | Run 10 | Run 11 | Run 12 | Run 13 |
|---|---|---|---|---|
| Step 1 | | | | |
| Cyclohexane, phm | 145 | 145 | 145 | 145 |
| Tetrahydrofuran, phm | 0.04 | 0.04 | 0.04 | 0.04 |
| n-Butyllithium initiator, phm | 0.03 | 0.03 | 0.03 | 0.031 |
| Styrene, phm | 37 | 37 | 37 | 37 |
| Polymerization Time, min | 17 | 16 | 16 | 17 |
| Peak Polymerization Temperature, °C. | 72 | 70 | 74 | 73 |
| Step 2 | | | | |
| n-Butyllithium initiator, phm | 0.032 | 0.03 | 0.03 | 0.03 |
| Styrene, phm | 16 | 16 | 16 | 16 |
| Polymerization Time, min | 14 | 14 | 16 | 15 |
| Peak Polymerization Temperature, °C. | 69 | 60 | 70 | 70 |
| Step 3 | | | | |
| Butadiene, phm | 3 | 5.5 | 5.5 | 3 |
| Polymerization Time, min | 18 | 19 | 18 | 18 |
| Peak Polymerization Temperature, °C. | 62 | 63 | 62 | 63 |
| Step 4 | | | | |
| n-Butyllithium initiator, phm | 0.099 | 0.099 | 0.1 | 0.099 |
| Butadiene, phm | 5 | 2.5 | 2.5 | 5 |
| Polymerization Time, min | 16 | 18 | 18 | 17 |
| Peak Polymerization Temperature, °C. | 62 | 61 | 59 | 62 |
| Step 5 | | | | |
| Styrene, phm | 22 | 22 | 22 | 22 |
| Polymerization Time, min | 14 | 14 | 14 | 14 |
| Peak Polymerization Temperature, °C. | 78 | 79 | 78 | 81 |
| Step 6 | | | | |
| Butadiene, phm | 17 | 17 | 17 | 17 |
| Polymerization Time, min | 19 | 20 | 21 | 17 |
| Peak Polymerization Temperature, °C. | 94 | 92 | 89 | 91 |
| Step 7 (Coupling) | | | | |
| Vikoflex 7170, phm | 0.4 | 0.4 | 0.4 | 0.4 |
| Time, min | 23 | 46 | 17 | 23 |
| Temperature, °C. | 99 | 74 | 76 | 96 |
| Step 8 (Terminating) | | | | |
| Water, phm | 0.2 | 0.2 | 0.3 | 0.2 |
| Carbon Dioxide, phm | 0.4 | 0.4 | 0.4 | 0.4 |
| Time, min | 30 | 18 | 30 | 29 |
| Temperature, °C. | NR[b] | NR[b] | 100 | NR[b] |
| Step 9 (Stabilizing) | | | | |
| Stabilizer Mixture, phm | 1.25 | 1.25 | 1.25 | 1.25 |
| Antiblocking agent, phm | 0.15 | 0.15 | 0.15 | 0.15 |
| Temperature, °C. | NR[b] | NR[b] | 102 | NR[b] |
| Recovered Resin | | | | |
| Melt Flow, g/10 min | 19.4 | 14.3 | 12.8 | 14.8 |

[a] After each addition of monomer, initiator or additive, the feed lines were rinsed with approximately 3–20 phm cyclohexane diluent and cleared with nitrogen.
[b] Not Recorded.

Injection molded test specimens of invention polymers 10, 11, 12 and 13 were evaluated and the results shown in Table 19 were obtained.

TABLE 19

Physical Properties of Articles Made from Invention Polymer (First Alternative to First Embodiment)

| Property | Invention Polymer 10 | Invention Polymer 11 | Invention Polymer 12 | Invention Polymer 13 |
|---|---|---|---|---|
| Melt flow, g/10 min | 19.4 | 14.3 | 12.8 | 14.8 |
| Hunter blueness, b | −10.2 | −9 | −9.6 | −10 |
| Haze, % | 1.1 | 1.1 | 1.2 | 1.2 |
| Notched Izod, ft-lb/in | 0.4 | 0.5 | 0.4 | 0.5 |
| Tensile strength at break, ksi | 3.33 | 3.63 | 3.85 | 3.45 |
| Tensile strength at yield, ksi | 3.18 | 3.38 | 3.91 | 3.25 |
| Elongation at break, % | 223 | 226 | 223 | 216 |
| Elongation at yield, % | 3.73 | 3.73 | 4.37 | 3.73 |
| Flexural modulus, ksi | 174 | 168 | 173 | 172 |
| Flexural strength, ksi | 3.92 | 3.84 | 4.57 | 3.91 |
| Shore D hardness | 65 | 65 | 67 | 65 |

Example III

A polymerization run was carried out according to the second embodiment of the present invention to demonstrate further the effect of charging initiator in the presence of a charge containing both butadiene and styrene monomers in the presence of a randomizer. The charges and results of the run (14) are shown in Table 20. The weight ratio of styrene to butadiene charged was 70 to 30. Samples were made with an i, $S_1$, i, $B_1/S_2$, $B_2$, i, $S_3$, $B_3$ addition sequence followed by coupling; monomer ratios of 37, 5/19, 6, 14, 19 were used.

The amount of initiator charged in the first step was 0.28 phm; about 1.6 times as much as that charged in the first step was charged in the second step. The third initiator charge was the same amount as charged in the second step.

Copolymer from run 14 was devolatilized to form invention copolymer 14, which had a melt flow of 18.2 g/10 min.

TABLE 20

Invention Run - Second Embodiment

| Components[a] | Run 14 |
|---|---|
| Step 1 | |
| Cyclohexane, phm | 154 |
| Tetrahydrofuran | 0.04 |
| n-Butyllithium initiator, phm | 0.028 |
| Styrene, phm | 37 |
| Polymerization Time, min | 15 |
| Peak Polymerization Temperature, °C. | 79 |
| Step 2 | |
| n-Butyllithium initiator, phm | 0.045 |
| Styrene, phm | 19 |
| Butadiene, phm | 5 |
| Polymerization Time, min | 20 |
| Peak Polymerization Temperature, °C. | 85 |
| Step 3 | |
| Butadiene, phm | 6 |
| Polymerization Time, min | 20 |
| Peak Polymerization Temperature, °C. | 83 |
| Step 4 | |
| n-Butyllithium initiator, phm | 0.095 |
| Styrene, phm | 14 |
| Polymerization Time, min | 19 |
| Peak Polymerization Temperature, °C. | 81 |
| Step 5 | |
| Butadiene, phm | 19 |
| Polymerization Time, min | 22 |
| Peak Polymerization Temperature, °C. | 100 |
| Step 6 (Coupling) | |
| Vikoflex 7170, phm | 0.4 |

TABLE 20-continued

Invention Run - Second Embodiment

| Components[a] | Run 14 |
|---|---|
| Time, min | 16 |
| Temperature, °C. | 96 |
| Step 7 (Terminating) | |
| Water, phm | 0.3 |
| Carbon Dioxide, phm | 0.4 |
| Time, min | 31 |
| Temperature, °C. | 106 |
| Step 8 (Stabilizing) | |
| Stabilizer Mixture, phm | 1.25 |
| Anti-blocking agent, phm | 0.15 |
| Recovered Resin | |
| Melt Flow, g/10 min | 18.2 |

[a]After each addition of monomer, initiator or additive, the feed lines were rinsed with approximately 3-20 phm cyclohexane diluent and cleared with nitrogen.

Injection molded test specimens of invention polymer 14 were evaluated and the results were as shown in Table 21.

TABLE 21

Physical Properties of Test Specimens Made from Invention Polymer (Second Embodiment)

| Property | Invention Polymer 14 |
|---|---|
| Melt flow, g/10 min | 18.2 |
| Hunter blueness, b | −20.3 |
| Haze, % | 3.0 |
| Notched Izod, ft-lb/in | 11.4 |
| Tensile strength at break, ksi | 2.42 |
| Tensile strength at yield, ksi | 1.99 |
| Elongation at break, % | 240 |
| Elongation at yield, % | 3.9 |
| Flexural modulus, ksi | 109 |
| Flexural strength, ksi | 2.31 |
| Shore D hardness | 62 |

Example IV

A set of runs of the first embodiment of the invention was made for the purpose of demonstrating the effect of adding the initiator from the fourth polymerization step prior to complete polymerization of all monomers from the third polymerization step (second alternative to the first embodiment). The runs in this set were designated runs 15 through 22.

In this example of the second alternative to the first embodiment of the invention, polymerization runs were carried out in a stirred, 100-gallon carbon steel reactor with internal cooling coils employing essentially anydrous reactants and conditions. Sequential polymerizations were conducted under nitrogen. Approximately 158 kg cyclohexane solvent (179 phm) were charged to the reactor. Reactants were charged to the reactor in the sequences and amounts indicated in Table 22. Lines were flushed with 1 kg cyclohexane following each charge. Polymerization was allowed to continue to completion after monomer charges in steps 1, 2, 4 and 5. Polymerization of step 3 was allowed for the amount of time indicated in the following recipes for each of runs 15 through 22; this time ranged from 0 to 12 minutes. Polymerization temperatures ranged from about 38° C. to about 110° C. and pressure ranged from about 2 psig to about 60 psig. Total monomer weight was about 90 kg.

After completion of the sequential polymerizations, Vikoflex ® 7170 (a coupling agent comprising epoxidized soybean oil) was charged to the reactor. After completion of the coupling reaction, the reaction was terminated by adding $CO_2$ and 0.2 phm water. The block copolymers were stabilized by adding 0.25 phm Irganox ® 1076 and 1.0 phm tris(nonylphenyl) phosphite to the reaction mixture.

Injection molded test specimens of the block copolymers and blends of invention polymers 15–22 exhibited the properties shown in Table 23.

TABLE 22

Invention Runs - Second Alternative to the First Embodiment

| | Run 15 | Run 16 | Run 17 | Run 18 | Run 19 | Run 20 | Run 21 | Run 22 |
|---|---|---|---|---|---|---|---|---|
| Step 1 | | | | | | | | |
| Cyclohexane, phm | 169 | 169 | 169 | 169 | 169 | 169 | 169 | 169 |
| Tetrahydrofuran, phm | 0.04 | 0.04 | 0.04 | 0.04 | 0.04 | 0.04 | 0.04 | 0.04 |
| n-Butyllithium initiator, phm | 0.032 | 0.032 | 0.032 | 0.032 | 0.033 | 0.027 | 0.022 | 0.027 |
| Styrene, phm | 40 | 40 | 40 | 40 | 37 | 37 | 37 | 37 |
| Cyclohexane, phm | 1 | 1 | 1 | 1 | 1 | 1 | 1 | 1 |
| Peak Polymerization Temperature, °C. | 90 | 90 | 90 | 91 | 86 | 87 | 87 | 87 |
| Step 2 | | | | | | | | |
| n-Butyllithium initiator, phm | 0.042 | 0.042 | 0.042 | 0.042 | 0.054 | 0.054 | 0.054 | 0.054 |
| Styrene, phm | 20 | 20 | 20 | 20 | 19 | 19 | 19 | 19 |
| Cyclohexane, phm | 1 | 1 | 1 | 1 | 1 | 1 | 1 | 1 |
| Peak Polymerization Temperature, °C. | 87 | 87 | 87 | 87 | 85 | 85 | 85 | 85 |
| Step 3 | | | | | | | | |
| Butadiene, phm | 7.5 | 7.5 | 7.5 | 7.5 | 9 | 9 | 9 | 9 |
| Cyclohexane, phm | 1 | 1 | 1 | 1 | 1 | 1 | 1 | 1 |
| Peak Polymerization Temperature, °C. | 77 | 83 | 85 | 88 | 81 | 87 | 89 | 91 |
| Polymerization Time[c] before next addition, min | 0 | 4 | 8 | 12 | 0 | 4 | 8 | 12 |
| Step 4 | | | | | | | | |
| n-Butyllithium initiator, phm | 0.090 | 0.090 | 0.090 | 0.090 | 0.11 | 0.11 | 0.11 | 0.11 |
| Styrene, phm | 15 | 15 | 15 | 15 | 14 | 14 | 14 | 14 |
| Cyclohexane, phm | 1 | 1 | 1 | 1 | 1 | 1 | 1 | 1 |
| Peak Polymerization | 90 | 94 | 92 | 92 | 90 | 95 | 94 | 92 |

TABLE 22-continued

| | Invention Runs - Second Alternative to the First Embodiment | | | | | | | |
|---|---|---|---|---|---|---|---|---|
| | Run 15 | Run 16 | Run 17 | Run 18 | Run 19 | Run 20 | Run 21 | Run 22 |
| Temperature, °C. | | | | | | | | |
| Step 5 | | | | | | | | |
| Butadiene, phm | 17.5 | 17.5 | 17.5 | 17.5 | 21 | 21 | 21 | 21 |
| Cyclohexane, phm | 1 | 1 | 1 | 1 | 1 | 1 | 1 | 1 |
| Peak Polymerization Temperature, °C. | 101 | 101 | 101 | 101 | 107 | 108 | 108 | 107 |
| Polymer Analysis Mw/Mn, thousands (wt % composition) | | | | | | | | |
| Peak 1 | 122 | 124 | 121 | 125 | 144 | na | na | 152 |
| Peak 2 | 46 | 49 | 49 | 49 | 46 | na | na | 50 |
| Peak 3 | 25 | 21 | 20 | 21 | 24 | na | na | 22 |
| Step 6 (Coupling) | | | | | | | | |
| Vikoflex 7170, phm | 0.4 | 0.4 | 0.4 | 0.4 | 0.4 | 0.4 | 0.4 | 0.4 |
| Cyclohexane, phm | 0.5 | 0.5 | 0.5 | 0.5 | 0.5 | 0.5 | 0.5 | 0.5 |
| Step 7 (Terminating) | | | | | | | | |
| Water, phm | 0.2 | 0.2 | 0.2 | 0.2 | 0.2 | 0.2 | 0.2 | 0.2 |
| Carbon Dioxide, phm | 0.18 | 0.18 | 0.18 | 0.18 | 0.18 | 0.18 | 0.18 | 0.18 |
| Temperature, °C. | 100–105 | 100–105 | 100–105 | 100–105 | 100–105 | 100–105 | 100–105 | 100–105 |
| Step 8 (Stabilizing) | | | | | | | | |
| Stabilizer Mixture, phm | 1.25 | 1.25 | 1.25 | 1.25 | 1.25 | 1.25 | 1.25 | 1.25 |
| Recovered Resin | | | | | | | | |
| Melt Flow, g/10 min | 12.1 | 9.8 | 7.3 | 11.7 | 18.8 | 10.8 | 7.9 | 8.8 |

$^a$After each addition of monomer, initiator or additive, the feed lines were rinsed with approximately 0.5–1.1 phm cyclohexane diluent and cleared with nitrogen.
$^b$na = not analyzed.
$^c$Indicates time elapsed since Step 3 monomer rinse.

TABLE 23

Physical Properties of Injection Molded Articles Made from Polymer (Second Alternative to the First Embodiment)

| Property | Invention Polymer 15 | Invention Polymer 16 | Invention Polymer 17 | Invention Polymer 18 | Invention Polymer 19 | Invention Polymer 20 | Invention Polymer 21 | Invention Polymer 22 |
|---|---|---|---|---|---|---|---|---|
| Melt flow, g/10 min | 12.1 | 9.8 | 7.3 | 11.7 | 18.8 | 10.8 | 7.9 | 8.8 |
| Haze, % | 2.5 | 1.7 | 1.7 | 1.5 | 1.5 | 1.0 | 0.9 | 1.1 |
| Hunter blueness, b | −10.8 | −5.3 | −3.8 | −4.6 | −14.3 | −10.2 | −9.0 | −7.7 |
| Shore D Hardness | 67 | 70 | 69 | 68 | na | na | na | na |
| Notched Izod impact, ft-lb/in | 0.3 | 0.4 | 0.4 | 0.5 | na | na | na | na |
| Tensile strength | | | | | | | | |
| yield, ksi | 3.7 | 4.1 | 4.4 | 3.8 | na | na | na | na |
| break, ksi | 3.0 | 3.3 | 3.6 | 3.7 | na | na | na | na |
| Elongation | | | | | | | | |
| yield, % | 3.8 | 4.0 | 4.2 | 3.7 | na | na | na | na |
| break, % | 175 | 192 | 188 | 195 | na | na | na | na |
| Flexural modulus, ksi | 216 | 217 | 219 | 206 | na | na | na | na |

$^a$na = not analyzed.

The result of charging the initiator and monomer of the fourth polymerization step before complete polymerization of the third step is initiation and polymerization of new polymeric species containing residual unpolymerized butadiene from the third polymerization step, thus giving at least one polymeric species with terminal tapered butadiene/styrene blocks. These runs show that polymodal copolymers formed in this way exhibit the high blueness associated with the other invention polymers.

Example V

A set of four comparison runs were made for the purpose of demonstrating the effect allowing longer periods of time to elapse before initiation of the fourth polymerization step in the second alternative to the first embodiment of the invention. The runs in this set were designated runs 23–26.

Polymerization runs were carried out in the same manner as those described in Example IV using the same equipment and process conditions. Reactants were charged to the reactor in the sequences and amounts indicated in Table 24. Injection molded test specimens of the block copolymers 23–26 exhibited the properties shown in Table 25.

TABLE 24

Comparison Runs$^a$ - (For Comparison with Second Alternative to the First Embodiment)

| | Run 23 | Run 24 | Run 25 | Run 26 |
|---|---|---|---|---|
| Step 1 | | | | |
| Cyclohexane, phm | 169 | 169 | 169 | 169 |
| Tetrahydrofuran, phm | 0.04 | 0.04 | 0.04 | 0.04 |
| n-Butyllithium initiator, phm | 0.032 | 0.032 | 0.027 | 0.027 |
| Styrene, phm | 40 | 40 | 37 | 37 |
| Cyclohexane, phm | 1 | 1 | 1 | 1 |
| Peak Polymerization Temperature, °C. | 91 | 90 | 87 | 86 |
| Step 2 | | | | |
| n-Butyllithium initiator, phm | 0.042 | 0.042 | 0.054 | 0.054 |
| Styrene, phm | 20 | 20 | 19 | 19 |
| Cyclohexane, phm | 1 | 1 | 1 | 1 |
| Peak Polymerization Temperature, °C. | 87 | 87 | 85 | 85 |

TABLE 24-continued

Comparison Runs[a] - (For Comparison with Second Alternative to the First Embodiment)

|  | Run 23 | Run 24 | Run 25 | Run 26 |
|---|---|---|---|---|
| Step 3 | | | | |
| Butadiene, phm | 7.5 | 7.5 | 9 | 9 |
| Cyclohexane, phm | 1 | 1 | 1 | 1 |
| Peak Polymerization Temperature, °C. | 89 | 92 | 92 | 93 |
| Polymerization Time before addition of Step 4 initiator, min | 16 | 20 | 16 | 20 |
| Step 4 | | | | |
| n-Butyllithium initiator, phm | 0.09 | 0.09 | 0.11 | 0.11 |
| Styrene, phm | 15 | 15 | 14 | 14 |
| Cyclohexane, phm | 1 | 1 | 1 | 1 |
| Peak Polymerization Temperature, °C. | 91 | 91 | 91 | 91 |
| Step 5 | | | | |
| Butadiene, phm | 17.5 | 17.5 | 21 | 21 |
| Cyclohexane, phm | 1 | 1 | 1 | 1 |
| Peak Polymerization Temperature, °C. | 101 | 101 | 107 | 107 |
| Polymer Analysis | | | | |
| Mw/Mn, thousands (wt % composition) | | | | |
| Peak 1 | 125 | 124 | 140 | 147 |
| Peak 2 | 50 | 49 | 49 | 50 |
| Peak 3 | 23 | 21 | 21 | 21 |
| Step 6 (Coupling) | | | | |
| Vikoflex 7170, phm | 0.4 | 0.4 | 0.4 | 0.4 |
| Cyclohexane, phm | 0.5 | 0.5 | 0.5 | 0.5 |
| Step 7 (Terminating) | | | | |
| Water, phm | 0.2 | 0.2 | 0.2 | 0.2 |
| Carbon Dioxide, phm | 0.18 | 0.18 | 0.18 | 0.18 |
| Temperature, °C. | 100–105 | 100–105 | 100–105 | 100–105 |
| Step 8 (Stabilizing) | | | | |
| Stabilizer Mixture, phm | 1.25 | 1.25 | 1.25 | 1.25 |
| Recovered Resin | | | | |
| Melt Flow, g/10 min | 7.7 | 8.1 | 9.0 | 10.7 |

[a]These comparison runs are runs of the first embodiment made for comparison with the second alternative to the first embodiment.

These comparison runs showed that when as much as 16 or 20 minutes of time was allowed to elapse after charges made in step 3 of the polymerization, substantially complete polymerization of the conjugated diene from step 3 had occurred, not leaving enough conjugated diene monomer to form a large enough conjugated diene block to cause noticeable blueness in the resulting copolymer. Polymers from runs 23–26 were blended with general purpose polystyrene, injection molded into test specimens and tested for blueness and other properties. Results are shown in Table 27.

Example VI

For purposes of comparison, four monovinylaromatic-conjugated diene polymodal block copolymers were prepared using sequences of charges different from those used in preparation of the invention copolymers. Comparative polymers 27, 28, 29 and 30 were prepared with the same process conditions and in a similar manner to that described in Example I. Multiple sequential initiator and monomer charges were followed by coupling with an epoxidized vegetable oil coupling agent. No polymer chain species started with polydiene or random copolymer blocks and no charges resulting in tapered blocks were made. The recipes for the comparison polymers 27–30 are shown in Table 25. Polymers 27, 28, and 29 were made from 75 weight percent styrene and 25 weight percent butadiene; polymer 30 was made from 74 weight percent styrene and 26 weight percent butadiene. Comparative polymers 27, 28, 29 and 30 had melt flows of 12.3, 12.7, 14.2 and 13.2 g/10 min, respectively, and all had low blueness. Properties of test specimens injection molded from these comparative polymers are shown in Table 26.

TABLE 25

|  | Comparison Runs | | | |
|---|---|---|---|---|
|  | Run 27 | Run 28 | Run 29 | Run 30 |
| Step 1 | | | | |
| Cyclohexane, phm | 154 | 154 | 154 | 154 |
| Tetrahydrofuran, phm | 0.04 | 0.04 | 0.04 | 0.04 |
| n-Butyllithium initiator, phm | 0.03 | 0.03 | 0.03 | 0.03 |
| Styrene, phm | 37 | 37 | 37 | 37 |
| Peak Polymerization Temperature, °C. | 79 | 80 | 80 | 96 |
| Polymerization Time, min. | 20 | 17 | 17 | 17 |
| Step 2 | | | | |
| n-Butyllithium initiator, phm | 0.03 | 0.031 | 0.03 | 0.03 |
| Styrene, phm | 16 | 16 | 16 | 16 |
| Peak Polymerization Temperature, °C. | 74 | 75 | 75 | 87 |
| Polymerization Time, min | 16 | 14 | 14 | 12 |
| Step 3 | | | | |
| Butadiene, phm | 8 | 3 | 6 | 6 |
| Peak Polymerization Temperature, °C. | 71 | 65 | 69 | 84 |
| Polymerization Time, min | 18 | 19 | 18 | 20 |
| Step 4 | | | | |
| n-Butyllithium, phm | 0.1 | 0.1 | 0.099 | 0.098 |
| Styrene, phm | 22 | 22 | 22 | 22 |
| Peak Polymerization Temperature, °C. | 86 | 81 | 85 | 96 |
| Polymerization Time, min | 17 | 18 | 14 | 12 |
| Step 5 | | | | |
| Butadiene, phm | 17 | 22 | 19 | 17 |
| Peak Polymerization Temperature, °C. | 95 | 99 | 101 | 115 |
| Peak Polymerization min | 19 | 21 | 20 | 28 |
| Step 6 (Coupling) | | | | |
| Vikoflex 7170, phm | 0.4 | 0.4 | 0.4 | 0.4 |
| Temperature, °C. | 80 | 90 | 95 | 104 |
| Time, minutes | 9 | 18 | 17 | NR[b] |
| Step 7 (Terminating) | | | | |
| Water, phm | 0.3 | 0.3 | 0.3 | 0.2 |
| Carbon Dioxide, phm | 0.4 | 0.4 | 0.4 | 0.4 |
| Temperature, °C. | 100 | 97 | 102 | NR[b] |
| Time, min | 38 | 30 | 29 | NR[b] |
| Step 8 (Stabilizing) | | | | |
| Stabilizer Mixture, phm | 1.25 | 1.25 | 1.25 | 1.25 |
| Anti-blocking agent, phm | 0.15 | 0.15 | 0.15 | 0.15 |
| Temperature, °C. | 103 | 101 | 103 | NR[b] |
| Recovered Resin | | | | |
| Melt Flow, g/10 min | 12.3 | 12.7 | 14.2 | 13.2 |

[a]After each addition of monomer, initiator or additive, the feed lines were rinsed with approximately 3–20 phm cyclohexane diluent and cleared with nitrogen.
[b]Not Recorded.

These comparison runs showed that in polymers without polymerization of a conjugated diene in the presence of initiator and with slightly different charge sequences, lower blueness than that achieved in the invention runs resulted. This and other properties obtained are shown in Table 26.

TABLE 26

Physical Properties of Comparison Polymer Test Specimens

| Property | Polymer 27 | Polymer 28 | Polymer 29 | Polymer 30 |
|---|---|---|---|---|
| Melt flow, g/10 min | 12.3 | 12.7 | 14.2 | 13.2 |
| Haze, % | 0.7 | 0.7 | 1 | 0.7 |
| Hunter blueness, b | −3.7 | −4.3 | −4.9 | −3.6 |
| Hardness D | 65 | 67 | 70 | 70 |
| Notched Izod impact, ft-lb/in | 0.4 | 0.28 | 0.45 | 0.48 |
| Tensile Strength | | | | |
| yield, ksi | 3.88 | 3.98 | 3.94 | 3.91 |
| break, ksi | 4.17 | 4.05 | 3.88 | 3.99 |
| Elongation | | | | |
| yield, % | 3.73 | 3.73 | 4 | 3.73 |
| break, % | 231 | 210 | 231 | 230 |
| Flexural modulus, ksi | 206 | 249 | 183 | 198 |
| Flexural strength, ksi | 5.28 | 5.29 | 4.37 | 4.61 |

Example VII

Blends of general purpose polystyrene with samples of Invention Polymers 15–22 and with Comparative Polymers 23–26 were made. These blends were prepared to demonstrate the effect of blending with polystyrene on blueness and other properties.

A series of blends of invention polymers from Example IV and comparison polymers from Example V were prepared by blending each of the polymer samples with Novacor ® 555 general purpose polystyrene.

The blends were 50:50 or 60:40 by weight and were prepared by pellet blending with general purpose polystyrene, extruding and chopping the blend. The polymers were then injection molded on an Arburg model 90 injection molder with zones 1, 2, 3, and nozzle at 210° C., 210° C., 220° C., and 210° C., respectively, to make specimens to test for properties.

The blend ratios and test results are shown in Table 27.

TABLE 27

Physical Properties of Injection Molded Articles Made from Polymer Blends

| Property | Invention Polymer 15 | Invention Polymer 16 | Invention Polymer 17 | Invention Polymer 18 | Invention Polymer 19 | Invention Polymer 20 |
|---|---|---|---|---|---|---|
| Blend ratio, S-B:PS | 60:40 | 60:40 | 60:40 | 60:40 | 50:50 | 50:50 |
| Melt flow, g/10 min | 11.7 | 10.5 | 9.1 | 11.3 | 16.9 | 17.9 |
| Haze, % | 4.2 | 3.0 | 2.7 | 3.0 | 11.6 | 10.0 |
| Hunter blueness, b | −21.0 | −18.0 | −16.5 | −17.5 | −22.0 | −22.8 |
| Shore D Hardness | 74 | 75 | 75 | 75 | 74 | 72 |
| Notched Izod impact, ft-lb/in | 0.4 | 0.2 | 0.4 | 0.2 | 0.2 | 0.3 |
| Tensile strength | | | | | | |
| yield, ksi | 6.1 | 6.3 | 6.3 | 5.9 | 5.2 | 4.9 |
| break, ksi | 4.4 | 4.4 | 4.5 | 4.3 | 4.2 | 4.0 |
| Elongation | | | | | | |
| yield, % | 4.8 | 4.9 | 4.9 | 4.6 | 4.0 | 3.8 |
| break, % | 56 | 59 | 31 | 34 | 51 | 50 |
| Flexural modulus, ksi | 310 | 309 | 313 | 306 | 313 | 303 |

| Property | Invention Polymer 21 | Invention Polymer 22 | Blend of Polymer 23 | Blend of Polymer 24 | Blend of Polymer 25 | Blend of Polymer 26 |
|---|---|---|---|---|---|---|
| Blend ratio, S-B:PS | 50:50 | 50:50 | 60:40 | 60:40 | 50:50 | 50:50 |
| Melt flow, g/10 min | 11.2 | 10.4 | 9.3 | 9.0 | 10.7 | 12.2 |
| Haze, % | 6.7 | 6.9 | 2.4 | 2.7 | 6.7 | 7.4 |
| Hunter blueness, b | −22.8 | −22.6 | −16.43 | −16.43 | −22.2 | −22.6 |
| Shore D Hardness | 74 | 75 | 77 | 75 | 74 | 74 |
| Notched Izod impact, ft-lb/in | 0.5 | 0.3 | 0.31 | 0.30 | 0.56 | 0.25 |
| Tensile strength | | | | | | |
| yield, ksi | 5.6 | 5.8 | 6.57 | 6.37 | 5.55 | 5.50 |
| break, ksi | 4.3 | 4.5 | 4.52 | 4.34 | 4.25 | 4.24 |
| Elongation | | | | | | |
| yield, % | 4.2 | 4.4 | 5.14 | 4.97 | 4.12 | 3.99 |
| break, % | 55 | 53 | 42.05 | 37.97 | 56.66 | 46.06 |
| Flexural modulus, ksi | 318 | 316 | 308 | 308 | 318 | 316 |

[a]S-B:PS is invention polymer: polystyrene ratio

The results of all these examples show that any of the embodiments of the invention can be used to produce resins from which can be made articles having high blueness and other properties comparable to or better than the properties of articles made from polymers of styrene or other monovinylaromatic/conjugated diene copolymers.

While the polymers and methods of this invention have been described in detail for the purpose of illustration, the inventive polymers and methods are not to be construed as limited thereby. This patent is intended to cover all changes and modifications within the spirit and scope thereof.

That which is claimed is:

1. A method of preparing a polymer comprising:
   sequentially contacting under polymerization conditions and in the presence of a randomizer
   (a) a monovinylaromatic monomer and an initiator; thereafter
   (b) an initiator and a monovinylaromatic monomer; thereafter
   (c) a conjugated diene; thereafter
   (d) an initiator and a mixture of monovinylaromatic monomer and conjugated diene monomer; thereafter
   (e) a conjugated diene; and thereafter
   (f) a coupling agent; and
   wherein no more than three initiator charges are present.

2. A method as recited in claim 1 wherein polymerization of each of steps (a), (b), (c), (d) and (e) is allowed to occur until essentially no free monomer is present prior to making the charges of each subsequent step.

3. A method according to claim 1 wherein each said monovinylaromatic monomer contains 8 to 12 carbon atoms and each said conjugated diene contains 4 to 6 carbon atoms, said monomers being added in a ratio of about 55 to about 95 weight percent monovinylaromatic monomer and about 5 to about 45 weight percent conjugated diene monomer, thus giving a resinous block copolymer containing at least one tapered block.

4. A method according to claim 1 wherein each said monovinylaromatic monomer contains 8 to 12 carbon atoms and each said conjugated diene contains 4 to 6 carbon atoms, said monomers being added in a ratio of about 60 to about 90 weight percent monovinylaromatic monomer and about 10 to about 40 weight percent conjugated diene monomer, thus giving a resinous block copolymer containing at least one tapered block.

5. A method according to claim 1 wherein each said monovinylaromatic monomer contains 8 to 12 carbon atoms and each said conjugated diene contains 4 to 6 carbon atoms, said monomers being added in a ratio of about 65 to 85 weight percent monovinylaromatic monomer and 15 to 35 weight percent conjugated diene monomer, thus giving a resinous block copolymer containing at least one tapered block.

6. A method according to claim 1 wherein said initiator in steps (a), (b) and (d) is charged in amounts effective to provide proportionate amounts of polymeric species in said polymer such that articles made from said polymer have high blueness.

7. A method according to claim 1 wherein said initiator in steps (a), (b) and (d) is charged in amounts effective to provide proportionate amounts of polymeric species in said polymer such that articles made from blends of said polymer with polystyrene have high blueness.

8. A method according to claim 1 wherein each said conjugated diene monomer is butadiene, each said monovinylaromatic monomer is styrene, said organomonoalkali metal initiator is n-butyllithium, said randomizer is chosen from the group of tetrahydrofuran, diethyl ether and potassium-tert-amylate, and said coupling agent is epoxidized vegetable oil.

9. A method according to claim 1 wherein polymerization is carried out in a hydrocarbon diluent;

wherein said polymerization is carried out in a substantial absence of oxygen and water at temperatures ranging from about $-10°$ C. to about $150°$ C.;

wherein, after said coupling agent reacts with products of said polymerization, the system is treated with a terminating agent and a stabilizer; and wherein, after addition of said terminating agents and stabilizer addition, any remaining hydrocarbon diluent is flashed off.

10. Copolymers produced in accordance with the method of claim 1.

11. An article made from the polymer of claim 10.

* * * * *